United States Patent
Carson et al.

(10) Patent No.: US 6,836,486 B2
(45) Date of Patent: Dec. 28, 2004

(54) SWITCHING OF LOW ORDER DATA STRUCTURES USING A HIGH ORDER SWITCH

(75) Inventors: Mark Carson, Belfast (GB); John Courtney, Greenisland (GB); Cormac Kelly, Belfast (GB)

(73) Assignee: Nortel Networks Limited, St. Laurent (CA)

(*) Notice: Subject to any disclaimer, the term of this patent is extended or adjusted under 35 U.S.C. 154(b) by 937 days.

(21) Appl. No.: 09/745,882

(22) Filed: Dec. 21, 2000

(65) Prior Publication Data

US 2002/0080830 A1 Jun. 27, 2002

(51) Int. Cl.[7] .......................... H04J 3/02; H04Q 11/02; H04L 12/26; H04L 1/00
(52) U.S. Cl. ...................... 370/542; 370/430; 370/540; 370/384; 370/248
(58) Field of Search ............................ 370/216, 250, 370/395, 430, 542, 539, 538, 541, 543, 465, 466, 467, 907, 300, 361, 369, 463, 535; 398/56, 83

(56) References Cited

U.S. PATENT DOCUMENTS

| | | | | |
|---|---|---|---|---|
| 5,600,648 | A | * | 2/1997 | Furuta et al. ................ 370/248 |
| 6,011,802 | A | * | 1/2000 | Norman ....................... 370/466 |
| 6,377,586 | B1 | * | 4/2002 | Seo et al. .................... 370/442 |
| 6,426,958 | B1 | * | 7/2002 | Crossett et al. ............. 370/466 |
| 6,477,178 | B1 | * | 11/2002 | Wakim et al. .............. 370/466 |
| 6,603,776 | B1 | * | 8/2003 | Fedders et al. ............. 370/476 |
| 6,628,651 | B1 | * | 9/2003 | Ryan et al. .................. 370/369 |
| 6,633,584 | B1 | * | 10/2003 | Russell et al. .............. 370/466 |
| 6,717,953 | B1 | * | 4/2004 | Heuer et al. ................ 370/466 |
| 2001/0021171 | A1 | * | 9/2001 | Notani ....................... 370/222 |
| 2002/0037019 | A1 | * | 3/2002 | Heuer ........................ 370/539 |

* cited by examiner

*Primary Examiner*—Man U. Phan
(74) *Attorney, Agent, or Firm*—Barnes & Thornburg LLP

(57) ABSTRACT

The invention relates particularly to the switching of an SDH low order VC-3 using a high order switching apparatus, such as an STS switch. A low order VC-3 is aligned with a TU-3 pointer to form a TU-3. The TU-3 is mapped into a high order VC-3 type data structure which, in turn, is aligned with an AU-3 pointer to form an AU-3 type data structure. The AU-3 type data structure is suitable for switching by the high order switch. After switching, the AU-3 type data structure is combined with similar AU-3 type data structures and converted into an AU-4 suitable for transmission across an SDH/SONET network. Advantageously, the arrangement is such that each AU-3 pointer has the same fixed value. Hence, conversion to an AU-4 is achieved by a fixed pointer replacement operation. The invention significantly reduces the amount of pointer processing that is required in comparison with conventional techniques for switching low order VC-3s using low order VT/TU switches and in comparison with a ITU-T standards compliant approach for switching low order VC-3s using a high order switch. The present invention relates to the switching of low order data structures. In particular, the invention relates to switching an SDH low order VC-3 using a high order switching apparatus.

19 Claims, 7 Drawing Sheets

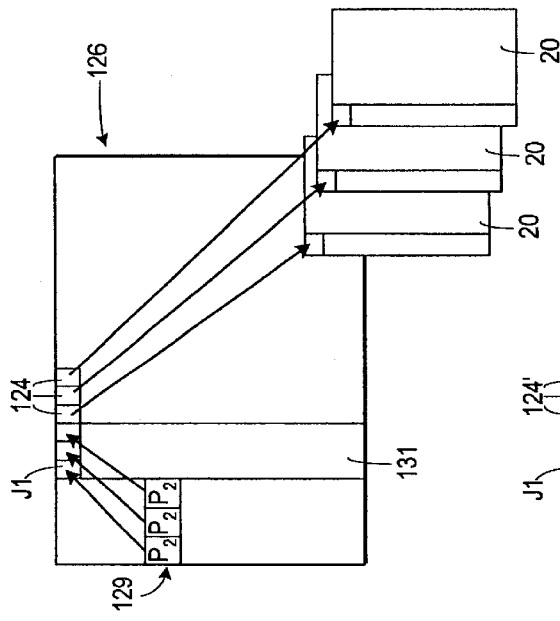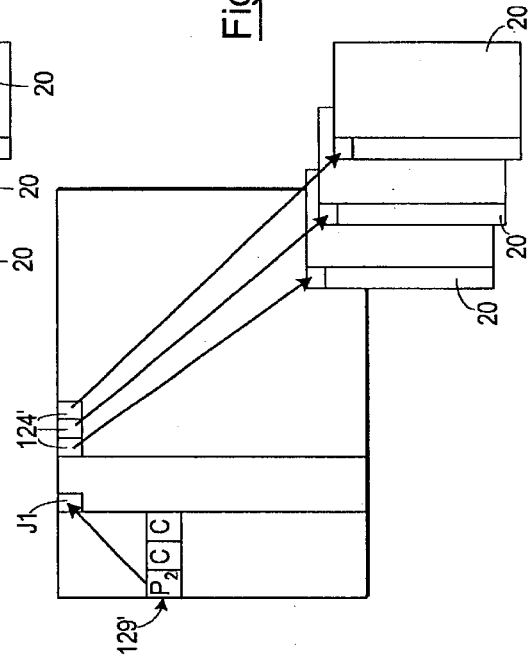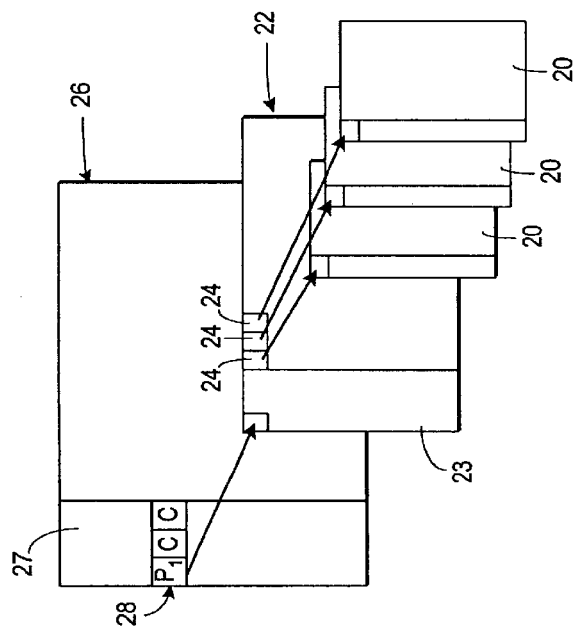

SWITCHING OF LOW ORDER DATA STRUCTURES USING A HIGH ORDER SWITCH

FIELD OF THE INVENTION

The present invention relates to the switching of low order data structures. In particular, the invention relates to switching an SDH low order VC-3 using a high order switching apparatus.

BACKGROUND TO THE INVENTION

The SONET (Synchronous Optical Network) Standard defined by ANSI (American National Standards Institute) is similar in many respects to the SDH (Synchronous Digital Hierarchy) standard defined by the ITU-T (International Telecommunications Union Telecommunications Standardization Sector). One key difference, however, is the respective basic unit of payload. In SONET, the basic unit is an STS-1, which offers a bandwidth of approximately 50 Mbit/s. With SDH, the basic unit is an AU-4, which offers a bandwidth of approximately 150 Mbit/s. SDH channels with smaller bandwidths are available and are provided by, for example, basic units known as VC-12 (approximately 2 Mbit/s) and VC-3 (approximately 50 Mbit/s). However, VC-12s and VC-3s are carried within VC-4s which, in turn, are carried within AU-4s. The VC-12s and VC-3s are therefore referred to as low order data structures, the VC-4 being a high order data structure. Switching a low order data structure within a network element, such as a multiplexer, is relatively complex and requires relatively expensive equipment.

Increasingly, telecommunications customers are able to make use of 50 Mbit/s bandwidth. In a SONET network, this bandwidth can conveniently be provided by the STS-1, which is a high order data structure. As a result, the infrastructure for SONET networks can be built using primarily STS, or STS-1, switches i.e. high order switches. High order switches are simpler and cheaper than low order switches.

With an SDH network, the 150 Mbit/s bandwidth provided by the AU-4 is more than most customers require. Accordingly, most SDH network infrastructures must support low order payloads such as the VC-12 and VC-3. This in turn means that the SDH network elements must support low order data switching.

In view of the increasing popularity of 50 Mbit/s services in particular, it is desirable to be able to switch low order VC-3s using a high order switch and so to reduce the complexity and cost of the required network infrastructure.

SUMMARY OF THE INVENTION

Accordingly, a first aspect of the invention provides a method of switching a TU-3 data structure contained in an AU-4 data structure, the TU-3 data structure including a TU-3 pointer, the AU-4 data structure including an AU-4 pointer and two pointer locations comprising concatenation indicators, the method comprising:

converting the AU-4 data structure into three AU-3 type data structures each having a respective AU-3 pointer;

switching at least one of said AU-3 type data structures using a high order data switching apparatus;

associating said at least one switched AU-3 type data structure with two further AU-3 type data structures; and converting said associated AU-3 type data structures into an AU-4 data structure, wherein said at least one AU-3 type data structure contains said TU-3 data structure associated with an AU-3 pointer, and the method further includes:

pointer processing said TU-3 pointer and said AU-3 pointers so that said AU-3 pointers are set to a common fixed value, and wherein the conversion of said associated AU-3 type data structures is performed by replacing said AU-3 pointers with a single AU-4 pointer and two concatenation indicators.

The method of the invention enables low order VC-3 data structures (which are included in respective TU-3 data structures) to be switched as a high order data structure using a high order data switch. This is advantageous since high order data switches are inherently less complex, and therefore less expensive, than the low order data switches that are conventionally required to switch low order VC-3s. Thus the overall complexity and cost of the network equipment is reduced.

Preferably, the conversion of said AU-4 data structure is performed by replicating the AU-4 pointer into each of said pointer locations comprising concatenation indicators to produce three AU-3 pointers.

Preferably, said pointer processing includes performing a high order pointer termination function on said AU-3 pointers; performing a low order pointer termination function on said TU-3 pointer; performing a low order pointer generation function to regenerate said TU-3 pointer; performing a high order frame generation function to generate a data frame structure comprising three corresponding AU-3 type data structures including said three AU-3 pointers set to said common fixed value.

At least some of said AU-3 type structures may comprise respective STS-1 type structures including STS-1 pointers.

The pointer processing may be performed before or after switching.

A second aspect of the invention provides a network element, or network node, arranged to perform the method of the first aspect of the invention.

A third aspect of the invention provides a data communications network comprising one or more network elements according to the second aspect of the invention.

A fourth aspect of the invention provides a method of switching a TU-3 data structure, the method comprising:

mapping the TU-3 into a high order VC-3 type data structure; aligning the high order VC-3 type data structure with a fixed AU-3 pointer to form an AU-3 type structure; causing the high order VC-3 type data structure to be switched by a high order switching apparatus; associating said switched VC-3 type data structure with two further VC-3 type data structures, each associated VC-3 type structure being aligned with a respective fixed AU-3 pointer having a common value; and replacing the AU-3 pointers with an AU-4 pointer and two concatenation indicators to produce an AU-4 data structure.

Further advantageous aspects of the present invention will become apparent to those ordinarily skilled in the art upon review of the following description of a preferred embodiment of the invention and with reference to the accompanying drawings, in which like numerals are used to represent like parts.

BRIEF DESCRIPTION OF THE DRAWINGS

FIG. 8 is a representation of an STM data frame incorporating an AU-4 and low order VC-3s;

FIG. 9 is a representation of the data structure of FIG. 8 converted in accordance with the invention;

FIG. 9a is a representation of the data structure of FIG. 9 converted back into the general form of the data structure in FIG. 8 in accordance with the invention.

DETAILED DESCRIPTION OF THE INVENTION

Figure 1:
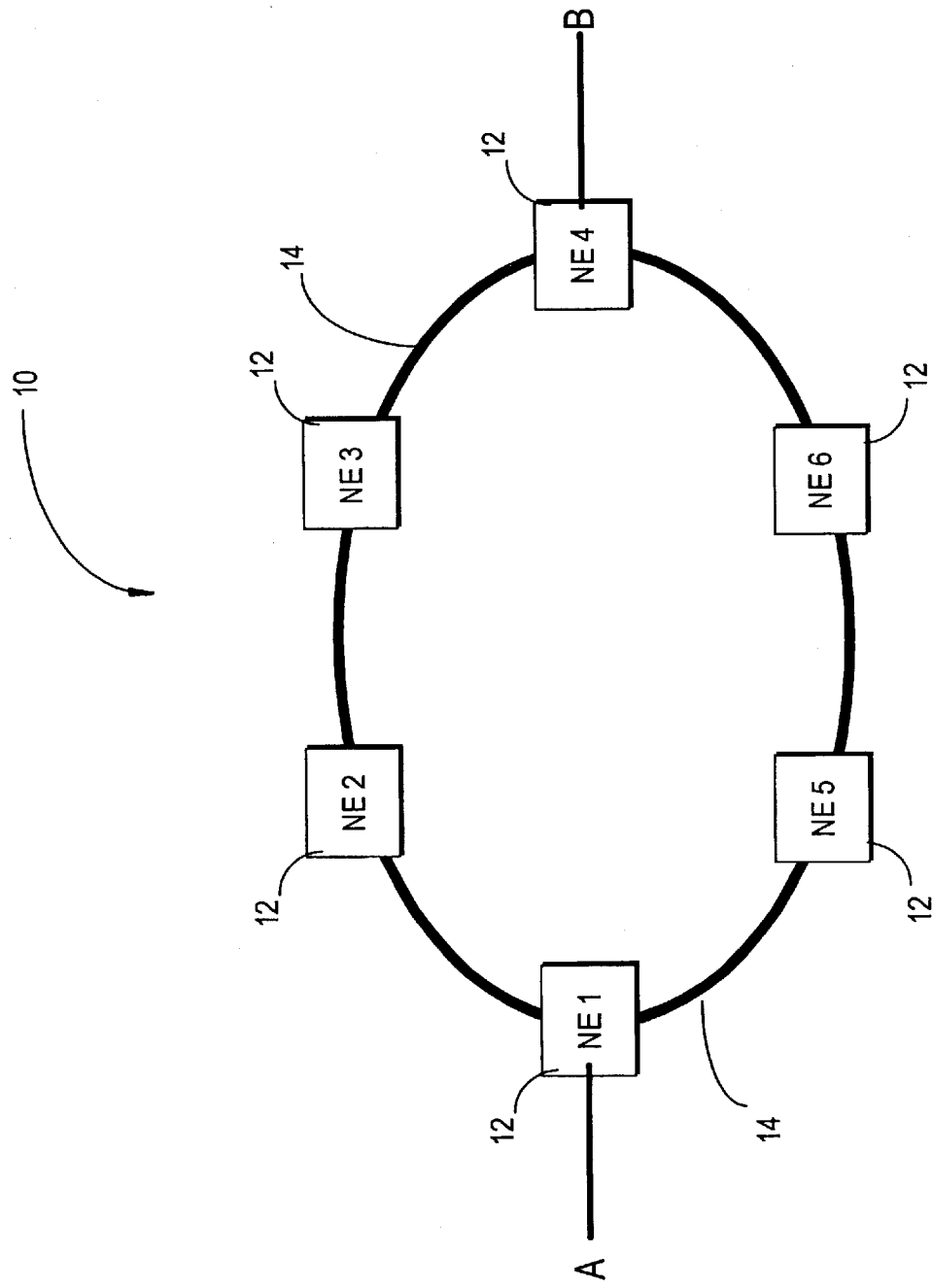
FIG. 1 is a schematic view of a synchronous transmission network.

Referring now to FIG. 1 of the drawings, there is shown, generally indicated at 10, a schematic representation of a synchronous transmission network, or synchronous data communication network. The network 10 comprises a plurality of network elements or nodes 12 interconnected by sections 14. Each node 12 comprises a synchronous transmission apparatus, or network equipment, in the form of, for example, a multiplexer, a cross-connect, a regenerator, or other signal processing or switching apparatus.

A synchronous data network is arranged to transport data signals, or traffic, which are arranged in accordance with a synchronous frame structure. There are a number of standard frame structures defined by, for example, ITU-T and Bellcore (now known as Telcordia), which are commonly used in synchronous transmission systems. In SDH and SONET transmission systems, data signals are packaged, or mapped, into frames known as Synchronous Transport Modules (STMs). An STM frame includes a payload area into which the data signals are mapped in container units. Each container, commonly referred to as a virtual container in SDH terminology, contains one or more data signals and some control information known as path overhead (POH). Smaller virtual containers may be loaded, or nested, within larger virtual containers. Nested containers are known as low order containers, or low order data structures, and the larger containers into which they are nested are known as high order containers, or high order data structures.

The virtual containers are normally arranged in tributary units (TUs) or administrative units (AUs). TUs and AUs are normally arranged in groups known as tributary unit groups (TUGs) and administrative unit groups (AUGs) respectively. TUGs and AUGs are mapped into the payload area of an STM frame. When the STM payload area is full, further control information, known as section overhead, is added to the frame. The purpose of the section overhead is to provide communication channels for functions including operations, administration and maintenance (OA&M) facilities, user channels, protection switching, section performance and frame alignment, between adjacent network nodes 12.

In a synchronous data network, the synchronous transmission apparatus, or network elements, incorporated therein are synchronised (locked in frequency but not in phase) to an overall network clock. However, the timing of the data signals that are mapped into the virtual containers may vary slightly with respect to the network clock. Further, the delay associated with a transmission link may vary slightly with time. Hence, the location of virtual containers within an STM frame may not be fixed. For example, a virtual container (VC) may move relative to its SDH frame due to loss of synchronization within the network, phase delays caused by diurnal expansion of optical fibres, or jitter.

Such variations are accommodated by associating a pointer with each virtual container. A pointer, which is included in a TU and an AU, and which comprises a plurality of data bits, indicates the position of the beginning of a respective virtual container with respect to its STM frame, and more specifically, with respect to the TU or AU as appropriate. A pointer can be incremented, decremented or otherwise adjusted, as appropriate, to accommodate for movements of the position of its virtual container within an STM-N frame. Thus, the pointer indicates the position of the VC within the STM-N frame and is adjusted as the VC enters a network node (for example, a multiplexer) to indicate the position of the VC relative to the nodal clock. This enables the network node to locate, switch, de-map, or otherwise process the VC. This process is known as pointer processing.

FIG. 8 illustrates an example of an STM frame structure. Data signals are first mapped into the payload area of a low order virtual container 20, for example a VC-3 or VC-12, which also includes path overhead 21. The low order virtual container 20 is then mapped into the payload area of a larger, high order virtual container 22, for example a VC-4, together with a pointer 24 which indicates the position of the low order virtual container 20 within the high order virtual container 22. The high order container 22 may be loaded with a plurality of low order containers 20, each associated with a respective pointer 24. In FIG. 8, the low order container is a VC-3. The pointer for a low order VC-3 container is known as a TU-3 pointer, the combination of a VC-3 with its respective pointer comprises a tributary unit known as a TU-3, and a TUG-3 comprises a single TU-3. The high order container 22 further includes path overhead information 23

The high order virtual container 22 is similarly mapped into the payload area of an STM frame 26 together with an associated pointer 28 to indicate its position within the STM frame 26. The STM payload area may be loaded with a plurality of virtual containers 22, each associated with a respective pointer 28. The pointer for a VC-4 container is known as an AU-4 pointer, the combination of a VC-4 and its respective pointer comprises an administrative unit known as an AU-4, and a group of AU-4s is known as an AUG. The STM frame 26 further includes section overhead information 27. Normally, the section overhead 27 includes a framing sequence of one or more framing bits (not shown) to enable detection of the frame 26. When high order pointer processing is performed at a network node, a process known as MSA (multiplexer section alignment) adjusts the AU-3 or AU-4 pointer values of all incoming SDH data streams such that the new pointer values indicate the offset of each high order VC-3 or VC-4 relative to the nodal clock.

Referring again to FIG. 1, one of the functions typically performed by a network element 12 is a switching operation. For example, NE 4 may be arranged to receive a data signal from NE 3 and to switch all or part of the payload contained within the data signal to destination B, the remaining part (if any) of the data signal being sent on to NE 5. Alternatively, NE 4 may receive respective data signals from NE 3 and NE 5 and be arranged to combine parts of the respective payloads for transmission to destination B. Destination B may be, for example, an end system (ES), such as a computer, or a further network element (NE), or node.

An SDH data signal typically comprises one or more AU-4s as the basic unit of payload. The, or each, AU-4 supports a respective VC-4 channel, i.e. a data channel comprising VC-4 data structures, of approximately 150 Mbit/s bandwidth. Where the data signal comprises more than one AU-4, the respective AU-4s are multiplexed together into columns on a byte-by-byte basis. The result is a payload in which the data for each channel is arranged in columns. This is illustrated in ITU-T G.707 standard, which is hereby incorporated herein by way of reference.

In this arrangement, the, or each, AU-4 and the VC-4s are high order data structures. It is a relatively straightforward matter to identify a high order VC-4 channel within an AU-4 since the location of the VC-4 is identified by its AU pointer and since, where there are more than one AU-4s multiplexed together, the respective payloads can be identified on a column-by-column basis. Thus, it is also a relatively straightforward matter to switch a VC-4 channel to a desired destination. Switching of high order VC-4 channels can be effected by a high order switching apparatus. High order switching apparatus, or switches, are relatively simple in construction and relatively inexpensive. An STS switch such as the Vitesse VSC9182 (www.vitesse.ccm) is an example of a high order switching apparatus.

In SDH, however, if it is desired to switch a data channel of less than 150 Mbit/s bandwidth e.g. a VC-12 (2 Mbit/s) or VC-3 (50 Mbit/s) channel, this is not conventionally possible using a high order switch. This is because the smaller channels are carried by low order data structures (e.g. VC-12 or VC-3) that are nested within the high order data structure VC-4. The location of a low order channel, or data structure, within a high order channel, or data structure, cannot be directly determined using column numbers as described above. This is because the high order VC-4s can move as a result of frequency variations in the network 10.

Before a low order channel can be switched, it must be realigned to the internal frame structure of the network element 12 so that there is a fixed mapping between each low order channel and the respective columns it occupies within the overall payload. This process involves many pointer processing operations and is commonly known as VT or TU alignment. Full VT/TU alignment of an SDH payload requires a relatively large number of processing blocks operating in parallel and is considered to be a complex and expensive operation.

Conventional pointer processing methods are defined by ITU-T/Bellcore standards such as ITU-T G783 which is hereby incorporated herein by reference.

In a SONET network, the basic unit of payload is the STS-1 (Synchronous Transport Signal) which provides a data channel of approximately 50 Mbits bandwidth. An STS-1 comprises a high order data structure known as an STS-1 SPE (synchronous payload envelope) and a pointer. STS-1s are normally transported between SONET network elements in an STS-N frame (e.g. STS-3, STS-12 or STS-48) which contains an appropriate number of STS-1s (for example, the STS-3 comprises three STS-1s). The Bellcore/Telcordia GR 253 standard describes the structure of SONET data signals and is hereby incorporated by reference.

Since the STS-1s/STS-1 SPEs are high order data structures, they can be conveniently switched using a high order STS switch i.e. with SONET, there is no need for full VT/TU alignment in order to switch a 50 Mbit/s STS-1 channel.

This is advantageous because 50 Mbit/s services are increasingly popular. Accordingly, in SONET networks, many of the network elements only require a high order switch. This reduces the cost and complexity of the network elements. In an SDH network, however, the same advantage cannot conventionally be obtained because 50 Mbit/s services are provided by low order VC-3s (and corresponding TU-3s) which can only be switched by more complex (and costly) network elements having low order switches and VT/TU alignment apparatus. Further, it can be difficult to transfer 50 Mbit/s SDH traffic using a SONET network since many of the SONET network elements do not support low order switching. Typically, this would involve routing an entire 150 Mbit/s AU-4 channel to a customer even if they only required a 50 Mbit/s TU-3/VC-3 channel. Clearly, it is desirable to be able to switch low order payloads using high order switches.

Figure 2:
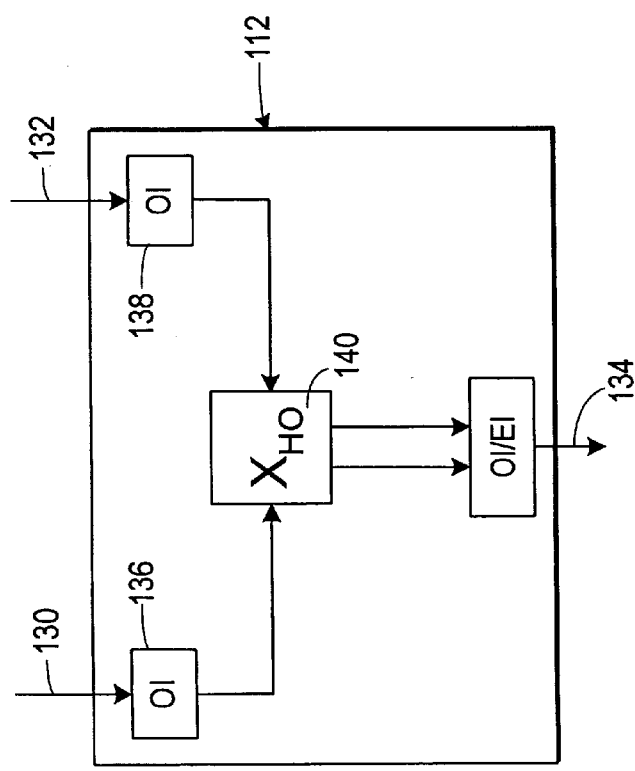
FIG. 2 is a schematic diagram of a conventional network element comprising a high order switch.

With reference now to FIG. 2 of the drawings, there is shown a schematic diagram of a conventional network element 112 arranged to perform high order switching. For reasons of clarity, only those components of the network element 112 that are relevant to data switching are shown. For illustrative purposes, the network element 112 is shown as having two input data lines 130, 132 and an output data line 134, although in practice a network element may have a plurality of each, and each may be arranged to serve as both an input line and an output line. The network element 112 further includes a respective line interface apparatus 136, 138 associated with each input data line 130, 132. In the present example, the network 10 is arranged to carry optical data signals and so the line interface apparatus comprise optical interface apparatus (OI). The optical interface apparatus 136, 138 are conventional in construction and are arranged to adapt an incoming optical data signal for use in the network element 112. For example, the Vitesse VSC9184, which is a section/line overhead processor and high order aligner, together with a suitable conventional electro-optic function unit may serve as a suitable optical interface block.

The output line 134 is associated with a line interface apparatus which, in the present example, is arranged to perform either optical or electrical interfacing (OI/EI) functions as required.

The network element 112 further includes a switch 140 arranged to perform high order data switching, i.e. to switch high order data channels, or data structures, in conventional manner. In particular, the high order switch 140 is arranged to switch one or more high order data channel received, in use, from the network 10 on one or other of the input lines 130, 132, to the output line 134. The switch 140 is also arranged to combine high order channels received on respective input lines 130, 132 for transmittal via the output line 134.

In SONET terms, the switch 140 may be referred to as an STS, or STS-1, switch and is capable of switching high order STS-1 channels received by the network element 112 within an STS-3 payload. In an SDH network, the switch 140 is capable of switching AU-4 channels received in an AU-4 payload i.e. the network element 112 is capable of switching high order VC-4s but not low order data structures such as VC-3s or VC-12s.

Figure 4:
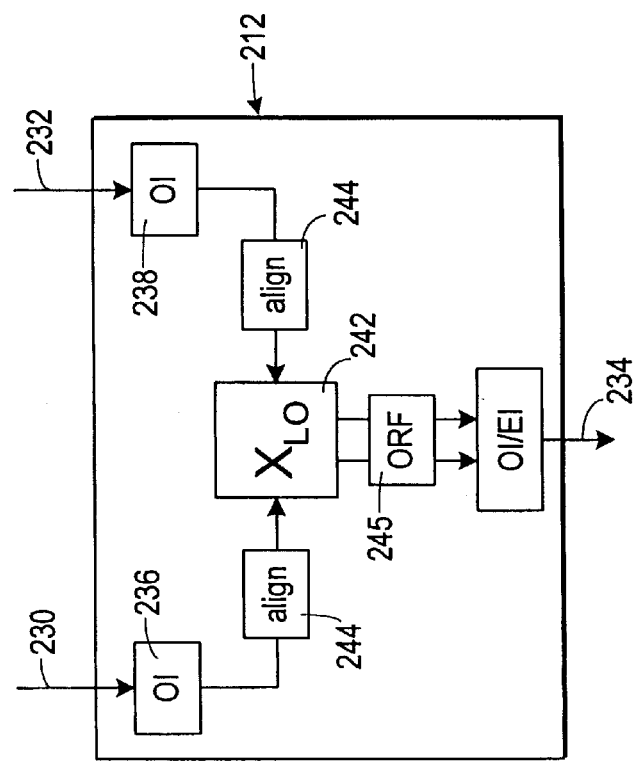
FIG. 4 is a schematic diagram of a conventional network element comprising a low order switch.

FIG. 4 shows an alternative network element 212 arranged to switch low order data structures in conventional manner. The network element 212 includes a low order switch 242 and respective alignment apparatus 244 between the switch 242 and the input lines 230, 232. The low order switch 242 is commonly referred to as a VT or TU switch. The alignment apparatus 244 are conventional in construction and are arranged to perform full VT/TU alignment of data signals. The network element 212 also includes a re-assembly apparatus 245 between the switch 242 and the output line 234. The assembly apparatus 245 is arranged to re-assemble low order data structures into high order data structures. For example, if the output line 134 is an SDH line, then the re-assembly apparatus 244 may be arranged to reassemble, or generate, VC-4s. It will be noted that in order to switch the low order data structures such as the VC-3, full VT/TU alignment is performed on incoming data signals (before reaching the switch 242). Conventional VT/TU alignment apparatus are relatively complex and expensive equipment.

It will also be noted that, in order to comply with SONET/SDH standards, the structure of the data signal transmitted from the network element 112, 212 on the output line 134, 234 must be the same as the structure of the data signal received by the network element 112, 212 on the input lines 130, 132, 230, 232. For example, if an AU-4 payload is received by the network element 112, 212, then the network element must also produce an AU-4 payload on the output line 134, 234.

In accordance with the present invention, network elements of the general types shown in FIGS. 2 and 4 are adapted to support switching of low order data structures, in particular the low order VC-3, without the need for full VT/TU alignment at the input and/or the output of the network element.

Figure 6:
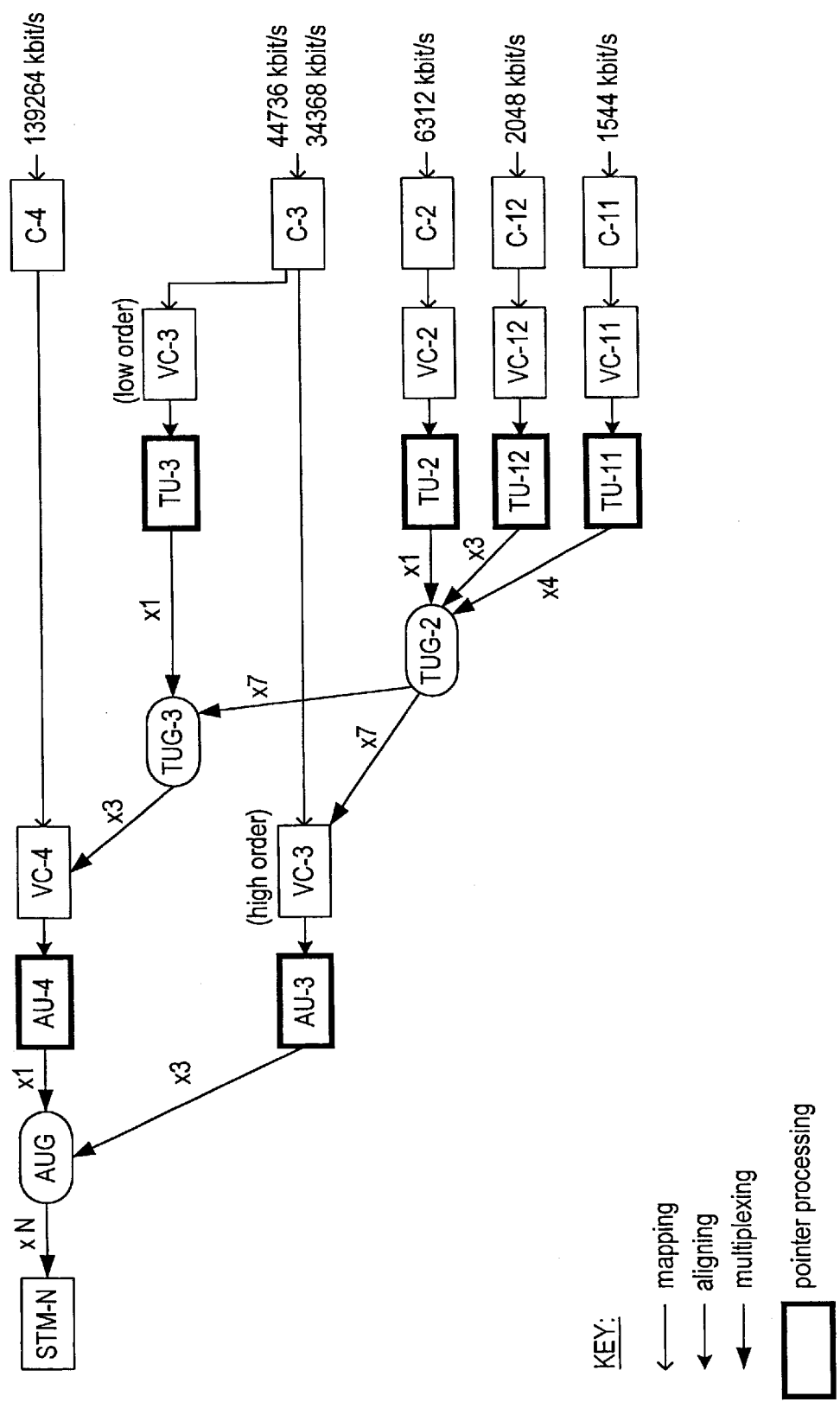
FIG. 6 is a schematic diagram of a multiplexing structure for synchronous data networks.

Referring now to FIG. 6, there is shown a schematic diagram of the SDH multiplexing structure as defined in ITU-T G.709 which is hereby incorporated herein by reference. FIG. 6 shows the position of a low order VC-3 with respect to the basic unit of payload AU-4, as described above. It will also be seen that the G.709 standard allows for a high order VC-3 which is included in an AU-3. However, currently, the AU-3 data structure is not used to carry traffic across SDH networks.

In accordance with the invention, a low order VC-3, which is received by a network element within an AU-4 in accordance with G.709, is incorporated, together with a TU-3 pointer, into a high order data structure, of the general high order VC-3 type, that is suitable for switching by a high order switch. More particularly, the high order VC-3 type structure is aligned with an AU-3 pointer to form an AU-3 structure that is suitable for switching by a high order switch. Switched AU-3s are converted back to the AU-4 structure before being sent onto the network 10. The process is so arranged that the conversion from AU-4 to AU-3 and back to AU-4 requires a significantly reduced number of pointer processing and alignment operations than would be required if full VT/TU alignment and a low order VT/TU switch was used, or if a G.707 standard compliant approach was used.

Figure 7:
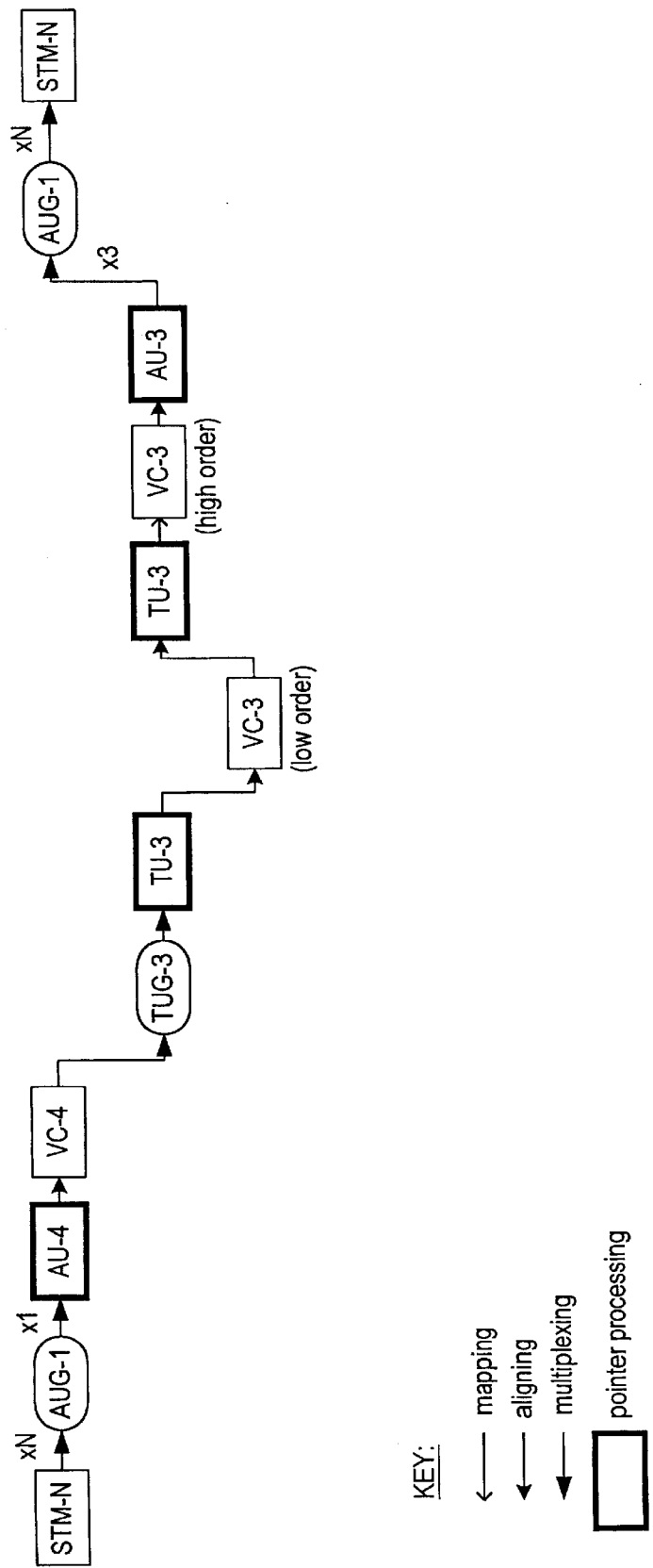
FIG. 7 is a schematic diagram of a process in which a low order data structure is converted to a high order data structure in accordance with the present invention.

The process of the invention is illustrated in FIG. 7. Considering first the left hand side (LHS) of FIG. 7, an STM-N frame arriving at a network element 12 includes one or more AU-4s. Each AU-4 includes up to three TU-3s, at least one of which it is desired to switch using a high order switch. Each TU-3 that it is desired to switch comprises a respective low order VC-3. The demultiplexing, aligning and mapping steps required to locate the low order VC-3 with respect to the received STM-N frame are conventional and are in accordance with G.709.

The left hand side (LHS) of FIG. 7 corresponds with the conventional data structures shown in FIG. 8 and described hereinbefore. The AU-4 comprises three pointer locations. One of these comprises the AU-4 pointer 28 which has a variable pointer value $P_1$, pointing to the beginning (J1 byte) of the VC-4 22. The other two pointer locations comprise concatenation indicators C in conventional manner. The VC-4 contains up to three low order VC-3s 20 each associated with a respective TU-3 pointer 24 which indicates the offset of the start (J1 byte) of the respective VC-3 20 with respect to the start (H3 byte) of the TU-3 pointer 24. The VC-3s are multiplexed, or byte-interleaved, within the VC-4 22. The position of the TU-3 pointers 24 with respect to the VC-4 22 is fixed but, as described above, the position of the VC-4 22 is variable with respect to the STM frame 26 and so the value P of the AU-4 pointer is variable. The respective value of the TU-3 pointers 24 is also variable as the position of the VC-3s 20 may change with respect to the VC-4 22. The AU-4 pointer 28 and the TU-3 pointers 24 are therefore variable, or floating, pointers. It will be noted that, while FIG. 8 shows a VC-4 comprising three low order VC-3s, in practice the VC-4 may alternatively comprise one or more TUG-2 structured TUG-3s (FIG. 6) and/or invalid data. For the purposes of the invention, it is assumed that the VC-4 carries at least one TU-3 that is required to be switched.

The right hand side (RHS) of FIG. 7 illustrates a non-conventional mapping according to the invention. The, or each, low order VC-3 is aligned with a respective new TU-3 pointer to produce a respective TU-3. The, or each, TU-3 is mapped into a respective high order VC-3 type data structure. The, or each, high order VC-3 structure is aligned with a respective AU-3 pointer to produce a respective AU-3. The AU-3s together form an AUG (in particular an AUG-1). Since the TU-3s take the form of a high order VC-3 (or STS-1 SPE in SONET terms), they are capable of being switched by a high order switch, such as an STS-1 switch. Put another way, the incoming low order VC-3s are mapped into STS-1 SPEs (which are equivalent to high order VC-3s) and are synchronized to the nodal clock in this form they are suitable for switching by a high order switch.

It will be noted that the high order VC-3 type structure into which a TU-3 is mapped does not correspond precisely with the standard high order VC-3 data structure defined in G.707. In particular, the standard G.707 high order VC-3 includes two fixed stuff columns (respectively at column numbers 30 and 59). In the mapping of the invention, these columns may be used for valid payload data. The high order switch used to switch the AU-3s/VC-3s is therefore arranged not to overwrite columns 30 and 59 during the switching process.

The non-standard mapping of the invention is described in more detail with reference to FIG. 9. The AU-4 pointer 28 and two pointer locations occupied by concatenation indicators are converted into three AU-3 pointers 129, each having a pointer value $P_2$. The three pointer values $P_2$ are each set to the same value and are fixed at that value. Conveniently, but not necessarily, the pointer values $P_2$ are set to 522 so that the AU-3 pointers 129 point to the first byte of row one of the AU-3 payload area. The AU-3s are byte interleaved and time multiplexed so that the first AU-3 pointer 129 points to the J1 byte of the AU-3 payload area while the following two AU-3 pointers point to the same location but in respect of the second and third AU-3s i.e. in successive multiplexing time slots. The arrangement is such that there is a fixed relationship between the location pointed to by the AU-3 pointers 129 (i.e. the J1 byte location) and the location reserved for the new TU-3 pointers 124. The location pointed to by each AU-3 pointer 129 and the H1 byte of its respective TU-3 pointer 124 are one byte apart in their respective time slots. The low order VC-3s 20 are aligned with respective TU-3 pointers 124 using conventional TU alignment techniques, i.e. the value of the TU-3 pointers is set according to the position of the low order VC-3s 20 with respect to the TU-3 pointer. It will be seen therefore that the single, variable AU-4 pointer 28 and (up to) three variable TU-3 pointers 24 are replaced by three fixed AU-3 pointers 129 and (up to) three variable TU-3 pointers 124.

Thus, in accordance with the invention, an 86 column TU-3, including TU-3 pointer, is placed inside 86 columns (84 payload columns and two stuff columns) of a high order VC-3 (or STS-1 SPE) and is therefore capable of being switched by a high order switch. The VC-4 path overhead 23 is included in the path overhead columns 131 of the high order VC-3s although by this stage in the processing of the incoming VC-4 data structure the original VC-4 path overhead will have already been terminated and is therefore redundant.

After switching, up to three AU-3s, from the same or from respective different received data signals, can be combined to form an AUG (also known as an AUG-1). However, an AUG-1 comprising one or more AU-3s is unsuitable for transmission across an SDH network. As described above, both input and output data signals from the network element must comprise an AU-4 payload to be standards compliant. Referring again to FIG. 7, the AUG-1 containing AU-3s is converted into an AU-4 by replacing the AU-3 pointers 129 with a single AU-4 pointer 28 having a value $P_2$ (which in the preferred embodiment takes the value 522) and two concatenation indicators C. The resulting AU-4 is suitable for transmission across an SDH network as part of an STM-N frame. It will be noted that the simplicity of this conversion results from the fact that, in accordance with the invention, each of the AU-3 pointers 129 has the same value $P_2$. Were the respective pointer values $P_2$ to be different, then further pointer processing and alignment operations would be required to perform the conversion to AU-4 and this would add to the required complexity and cost of the network element, or node.

Figure 3:
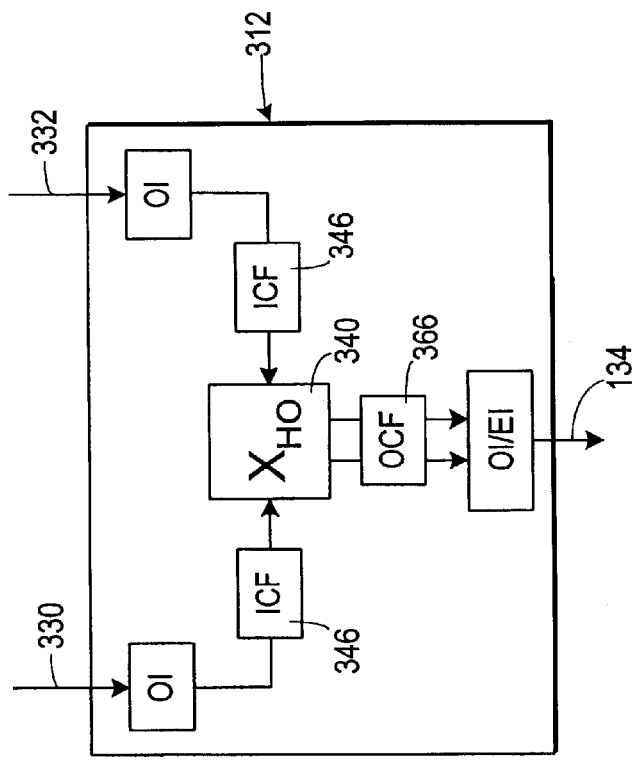
FIG. 3 is a schematic diagram of a network element comprising a high order switch and arranged in accordance with the present invention.

FIG. 3 is a schematic representation of a network element 312, of the general type shown in FIG. 2, arranged in accordance with the invention to enable low order data structures, in particular the low order VC-3, to be switched using a high order switch 340, such as an STS, or STS-1, switch. The network element 312 includes a respective first conversion apparatus, or input conversion apparatus 346 associated with each input line 330, 332 and arranged to perform an input conversion function (ICF) on incoming data signals before they are provide to the high order switch 340.

Figure 10:
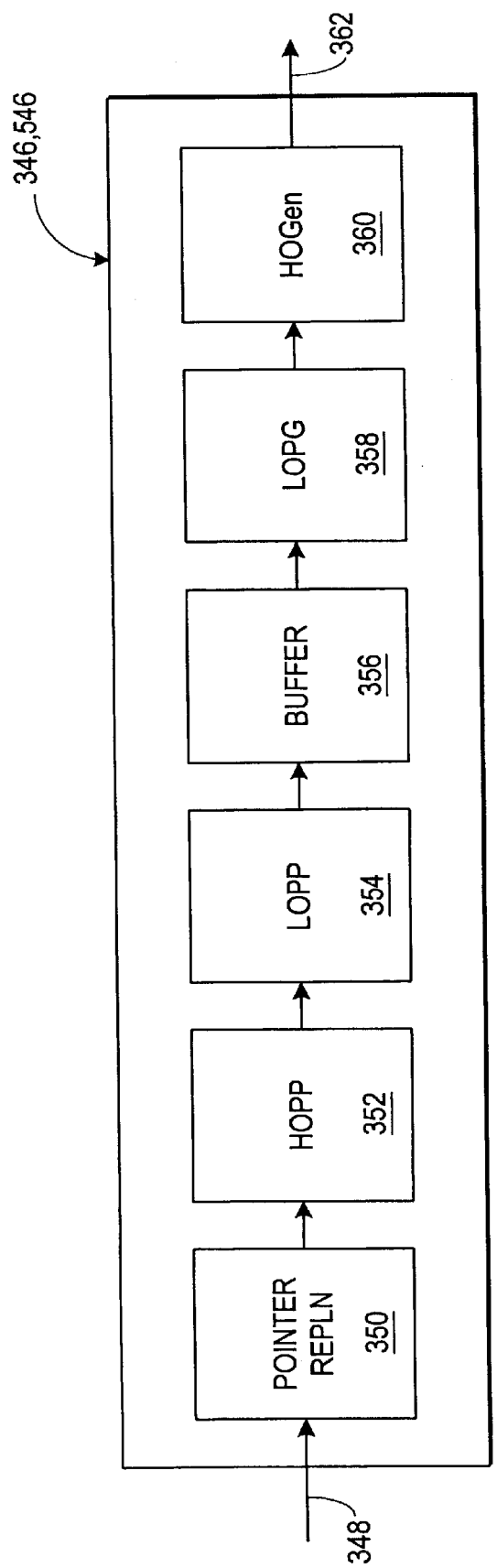
FIG. 10 is a schematic diagram of an input conversion apparatus for use in the network elements of FIGS. 3 and 5.

The input conversion apparatus 346, which may conveniently be included in the input port(s) of a network element 312, is shown in more detail in FIG. 10. The input conversion apparatus 346 comprises pointer processing apparatus and is arranged to receive an input data signal, at input 348, comprising an AU-4 payload as shown in FIG. 8. A pointer replicate apparatus 350 (POINTER REPLN) is arranged to replicate the AU-4 pointer 28 into the two pointer locations of the AU-4 normally occupied by the concatenation indicators, thereby creating three AU-3 pointers 129 each having the same value as the AU-4 pointer 28. This has the effect of converting the AU-4 into three AU-3 type structures. One or more of the AU-3s contains a TU-3. In the case where the received AU-4 comprises three low order VC-3s 20 (as shown in FIG. 8), each created AU-3 comprises a respective TU-3.

It will be noted that replicating the AU-4 pointer 28 into the two pointer locations normally occupied by concatenation indicators does not create three AU-3s that are fully standards compliant. In particular, in a fully standards compliant AUG-1 containing three AU-3s, the first column of the first of the AU-3s contains path overhead while the first column 131 of the subsequent two AU-3s comprise stuff.

It is possible to switch the AU-3s at this stage using the high order switch 340. In the preferred embodiment of FIG. 3, however, pointer processing operations are performed on the AU-3s before switching.

To this end, the input conversion apparatus 346 also includes a high order pointer processing (HOPP) apparatus 352, arranged to perform a high order pointer termination function, and a low order pointer processing (LOPP) apparatus 354, arranged to perform a low order pointer termination function. The HOPP 352 terminates the AU-4 pointer 28 and the LOPP 354 terminates the TU-3 pointers 24.

The input conversion apparatus 346 further comprises elastic storage apparatus such as bank of data buffers 356, or FIFOs (First-In First-Out memory). Typically, there is a buffer 356, or FIFO, for each VC-3 20. Also included in the input conversion apparatus 346 is a second low order pointer processing, or pointer generation, apparatus 358 arranged to perform a low order pointer generation (LOPG) function, and a high order frame generation (HOGen) apparatus 360. The data buffers 356, the LOPG 358 and the HOGen 360 are co-operable to generate the data structure illustrated in FIG. 9 in conventional manner. The LOPG 356 generates the new variable TU-3 pointers 124. The HOGen 360 apparatus generates the high order AU-3 frames with AU-3 pointer 129 set to the same fixed value (522 in the preferred embodiment)

Thus, the HOPP 352, the LOPP 354, the LOPG 358 and the HOGen 360, in conjunction with the buffers 356, perform pointer processing operations on the newly created AU-3 pointers 129 and the TU-3 pointers 24 such that the pointer value $P_2$ of each AU-3 pointer 129 is set to the same fixed value, preferably 522, and the values of the new TU-3 pointers 124 are adjusted accordingly. The pointer processing operations are in accordance with ITU-T G.707 and G.783 and together comprise standard AU and TU alignment. The appropriate alignment functions may be performed by, for example, the PMC Sierra PM5363 unit as supplied by PMC Sierra (www.pmc-sierra.com).

Each AU-3 containing a TU-3 that is required to be switched is provided to the switch 340 via output 362. The switch 340, being a high order switch, is capable of switching the AU-3 to the required output data line 334 (only one shown in FIG. 3). Thus, the TU-3, including a low order VC-3, is capable of being switched by a high order switch because the TU-3 is included in the AU-3 as a high order structure i.e. as a high order VC-3 type structure. It will be noted that while, normally, the AU-3s are switched by the high order switch 340, it is possible to arrange the switch to only switch the high order VC-3s since the AU-3 pointers 129 are fixed to the same value $P_2$ and may therefore be reproduced after switching.

The high order switch 340 provides switched AU-3s to the output port (not shown) of the network element 312 in conventional manner such that the switched AU-3s are arranged, or associated, in AUG-1s, where an AUG-1 comprises three AU-3s. Each AU-3 within an AUG-1 need not necessarily emanate from the same input line 330, 332. Further, each AU-3 within an AUG-1 need not necessarily comprise a TU-3 in the manner described above. For example, an AU-3 may comprise no, or invalid, data, or may contain one or more TUG-2 structured TUG-3s. Thus, for example, it may be said that a switched AU-3 (containing a TU-3) is associated with up to two further switched AU-3s, or up to two further AU-3 type data structures (which may for example contain no valid data) or a combination thereof. In any event, the pointer processing operations carried out to create the respective AU-3s (AU-3 type data structures) are arranged to set each of the AU-3 pointers 129 to the same fixed value, conveniently 522. For example, in FIG. 3, this processing may be carried out at the ICF blocks 346 while in FIG. 5, the processing may be carried out by the ICF blocks 546 or the alignment apparatus 544.

As described above, it is not normal to send AU-3s across an SDH network. Thus, the network element 312 further includes a second conversion apparatus, or output conversion apparatus 366 (conveniently located at the output port) arranged to perform a fixed pointer replacement function (output conversion function, OCF) and, to this end, comprises a fixed pointer replacement apparatus. The respective AU-3 pointer 129 of each AU-3 type structure received at the output port has the same value $P_2$ (522 in the present example). Thus, the OCF 366 is arranged to replace each AU-3 pointer 129 of an AUG-1 with a single AU-4 pointer (of the same structure as AU-4 pointer 28) and two concatenation indicators C. This has the effect of converting the AUG-1 comprising three AU-3 type structures into an AUG-1 comprising a single AU-4 wherein one of the AU-4 pointer locations comprises the new AU-4 pointer with a value $P_2$, and the other AU-4 pointer locations comprise concatenation indicators C. This is illustrated in FIG. 9a where the new AU-4 pointer is shown as 129' and the TU-3 pointers are shown as 124'. It will be noted that data frame structure shown in FIG. 9a is similar to the general AU-4 structure shown in FIG. 8 and that the low VC-3s 20 are no longer encapsulated in a manner that allows them to be switched as high order data structures. The AU-4, being the basic SDH unit of payload is suitable for sending out onto the network 10.

The invention offers significant savings in required processing operations when compared to a conventional network element of the general type shown in FIG. 4. For example, to process an STM-64 signal, a conventional FIG. 4 type network element would require 5440 pointer processors to switch low order VC-3s, whereas the network element 312 of the invention requires only 256 pointer processors.

Figure 5:
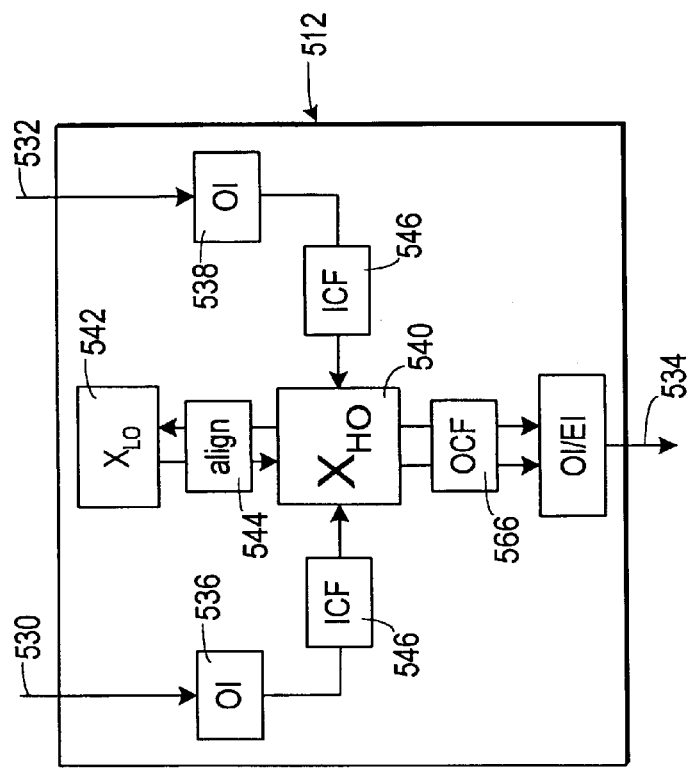
FIG. 5 is a schematic diagram of a network element comprising a low order switch and arranged in accordance with the present invention.

With reference to FIG. 5, there is shown a network element 512 embodying the invention in which the network element 512 is arranged to perform low order switching as well as high order switching. The network element 512 is similar to the network element 312 of FIG. 3 and further includes a low order switch 542, or VT/TU switch, and a full VT/TU alignment apparatus 544. As described above, an AU-3 created by an input conversion apparatus 546 may comprise a TUG-2 structured TUG-3 which may contain low order data structures such as the VC-2, VC-12 or VC-11. If it is desired to switch, or otherwise process, these low order data structures, then the low order switch 542 is required. The high order switch 540 is arranged to send TUG-2 structured TUG-3s to the low order switch 542 via the VT/TU alignment apparatus 544. The alignment apparatus 544 is arranged to perform full VT/TU alignment on the TUG-3 and to provide the low order VC-2, VC-12 or VC-11 structures to the low order switch 542. The low order switch 542 performs the required switching operation and returns the switched low order structures to the high order switch 540 via the alignment apparatus 544. The alignment apparatus 544 is arranged to convert the switched low order structures into an AU-3 structure containing a TUG-2 structured TUG-3 wherein each of the AU-3 pointers is set to the same fixed value $P_2$, that is used by the ICF unit 546 (which fixed value is 522 in the preferred embodiment). The high order switch 540 switches the AU-3 as required. The switched AU-3 is then incorporated into an AUG-1 and converted into an AU-4 as described above.

The low order switch 542 required in the FIG. 5 embodiment is significantly less complex, and therefore less expensive, than the low order switch 242 in FIG. 4. Typically, the switch 242 is a 40 GHz switch comprising 64 integrated circuits, or chips, whereas the switch 542 need only be a 10 GHz switch comprising 4 chips.

The invention also offers significant savings in required processing operations when compared to a fully standards compliant approach for switching a low order VC-3 using a high order switch. In accordance with G.707 (and in particular FIG. 6.4a of G.707), the standards approach requires six pointer processing steps. Of these, three are pointer termination, two are variable pointer generation, and one is fixed pointer generation. In contrast, in order to perform the invention, the network element 312 performs only four pointer processing operations on a received data signal, namely: two pointer terminations; one variable pointer generation; and one fixed pointer generation.

The embodiments of FIGS. 3 and 5 the pointer processing operations carried out by the HOPP 352, the LOPP 354, the LOPG 358 and the HOGen 360 in conjunction with the buffers 356, take place before switching. This need not necessarily be the case. In an alternative embodiment (not illustrated), the input conversion apparatus (ICF) performs the pointer replication function (corresponding to the POINTER REPLN apparatus 350 in FIG. 10). As described above, this converts an AU-4 into three AU-3 type structures that are suitable for switching by a high order switch. After switching, however, when three AU-3s are combined to form an AUG-1, the values of the respective AU-3 pointers will not necessarily be the same. Thus, the output conversion apparatus (OCF) includes respective apparatus corresponding to the HOPP 352, the LOPP 354, the LOPG 358, the HOGen 360 and the buffers 356 of FIG. 10, in order to perform pointer processing. The pointer processing is arranged such that the AU-3 pointers are set to the same value, conveniently 522, and the TU-3 pointers are adjusted accordingly. The resulting AUG-1 has three AU-3 pointers with the same value and is suitable for conversion into an AU-4 by means of a fixed pointer replacement function as described above.

The foregoing description refers to the mapping of a TU-3, including a low order VC-3, into a high order VC-3 type structure that, in turn, is aligned with an AU-3 type structure. It will be appreciated that an SDH high order VC-3 is equivalent to a SONET STS-1 SPE and that an AU-3 is equivalent to a SONET STS-1. It may therefore be said that the invention involves the mapping of a TU-3, including a low order VC-3, into a high order VC-3 or an STS-1 SPE type structure that, in turn, is aligned with an AU-3 or an STS-1 type structure.

It will be apparent from the foregoing description that the term "AU-3 type data structure" is intended to embrace data structures that conform generally to the SDH AU-3 data structure, including: AU-3s in which the stuff columns do not comply with SDH standards; SONET STS-1 data structures (where the stuff columns do not necessarily comply with SONET standards); AU-3s (or STS-1s) comprising no, or invalid, data; AU-3s (or STS-1s) comprising one or more TU-3 or one or more TUG-2 structured TUG-3.

Similarly, the term "high order VC-3 type structure" is intended to embrace data structures that conform generally to the SDH high order VC-3 data structure, including: high order VC-3s in which the stuff columns do not comply with SDH standards; SONET STS-1 SPE data structures (where the stuff columns do not necessarily comply with SONET standards); high order VC-3s (or SPS-1 SPEs) comprising no, or invalid, data; high order VC-3s (or SPS-1 SPEs) comprising one or more TU-3 or one or more TUG-2 structured TUG-3.

The invention is not limited to the embodiments described herein which may be modified or varied without departing from the scope of the invention.

What is claimed is:

1. A method of switching a TU-3 data structure contained in an AU-4 data structure, the TU-3 data structure including a TU-3 pointer, the AU-4 data structure including an AU-4 pointer and two pointer locations comprising concatenation indicators, the method comprising:

converting the AU-4 data structure into three AU-3 type data structures each having a respective AU-3 pointer;

switching at least one of said AU-3 type data structures using a high order data switching apparatus;

associating said at least one switched AU-3 type data structure with two further AU-3 type data structures; and converting said associated AU-3 type data structures into an AU-4 data structure, wherein said at least one AU-3 type data structure contains said TU-3 data structure associated with an AU-3 pointer, and the method further includes:

pointer processing said TU-3 pointer and said AU-3 pointers so that said AU-3 pointers are set to a common fixed value, and wherein the conversion of said associated AU-3 type data structures is performed by replacing said AU-3 pointers with a single AU-4 pointer and two concatenation indicators.

2. A method as claimed in claim 1, wherein the conversion of said AU-4 data structure is performed by replicating the AU-4 pointer into each of said pointer locations comprising concatenation indicators to produce three AU-3 pointers.

3. A method as claimed in claim 1, wherein said pointer processing includes performing a high order pointer termination function on said AU-3 pointers; performing a low order pointer termination function on said TU-3 pointer; performing a low order pointer generation function to regenerate said TU-3 pointer; performing a high order frame generation function to generate a data frame structure comprising three corresponding AU-3 type data structures including said three AU-3 pointers set to said common fixed value.

4. A method as claimed in claim 1, wherein at least some of said AU-3 type structures comprise respective STS-1 type structures including STS-1 pointers.

5. A method as claimed in claim 1, wherein said pointer processing is performed before switching.

6. A method as claimed in claim 1, wherein said pointer processing is performed after switching.

7. A network element arranged to receive a data signal comprising a TU-3 data structure contained in an AU-4 data structure, the TU-3 data structure including a TU-3 pointer, the AU-4 data structure including an AU-4 pointer and two pointer locations comprising concatenation indicators, the network element comprising:

a high order data switching apparatus;

a first conversion apparatus arranged to convert said AU-4 data structure into three AU-3 type data structures, each having a respective AU-3 pointer, and to cause at least one of said AU-3 type data structures to be switched by said high order data switch;

a second conversion apparatus arranged to convert said at least one switched AU-3 type data structure and two associated AU-3 data structures into an AU-4 data structure, wherein said at least one AU-3 type data structure contains said TU-3 data structure associated with an AU-3 pointer, and the apparatus further includes:

pointer processing apparatus arranged to perform pointer processing of said TU-3 pointer and said AU-3 pointers so that said AU-3 pointers are set to a common fixed value, and wherein said second conversion apparatus includes a pointer replacement apparatus arranged to convert said associated AU-3 type data structures by replacing said AU-3 pointers with a single AU-4 pointer and two concatenation indicators.

8. A network element as claimed in claim 7, wherein said first conversion apparatus includes a pointer replication apparatus arranged to convert said AU-4 data structure by replicating the AU-4 pointer into each of said pointer locations comprising concatenation indicators to produce three AU-3 pointers.

9. A network element as claimed in claim 7, wherein said pointer processing apparatus comprises a high order pointer processing apparatus arranged to perform a high order pointer termination function on said AU-3 pointers; a low order pointer processing apparatus arranged to perform a low order pointer termination function on said TU-3 pointer; a low order pointer generation apparatus for regenerating said TU-3 pointer; a high order frame generation apparatus; and an elastic storage apparatus, the low order pointer generation apparatus and the high order frame generation apparatus being co-operable with the elastic storage apparatus to generate a data frame structure comprising three corresponding AU-3 type data structures including said three AU-3 pointers set to said common fixed value.

10. A network element as claimed in claim 7, wherein one or more of said AU-3 type structures comprise respective STS-1 type structures including STS-1 pointers.

11. A network element as claimed in claim 7, wherein said first conversion apparatus includes said pointer processing apparatus.

12. A network element as claimed in claim 7, wherein said second conversion apparatus includes said pointer processing apparatus.

13. A network element as claimed in claim 7, wherein said high order switching apparatus comprises an STS switch.

14. A data communications network comprising a network element as claimed in claim 7.

15. A data communications network as claimed in claim 14, wherein at least part of the network comprises an SDH network.

16. A data communications network as claimed in claim 14, wherein at least part of the network comprises a SONET network.

17. A method of switching a TU-3 data structure, the method comprising:

mapping the TU-3 into a high order VC-3 type data structure;

aligning the high order VC-3 type data structure with a fixed AU-3 pointer to form an AU-3 type structure;

causing the high order VC-3 type data structure to be switched by a high order switching apparatus;

associating said switched VC-3 type data structure with two further VC-3 type data structures, each associated VC-3 type structure being aligned with a respective fixed AU-3 pointer having a common value; and replacing the AU-3 pointers with an AU-4 pointer and two concatenation indicators to produce an AU-4 data structure.

18. A method as claimed in claim 17, wherein said AU-3 type structure comprises an STS-1 type structure.

19. A method as claimed in claim 17, wherein said high order VC-3 type data structure comprises an STS-1 SPE type data structure.

* * * * *